(No Model.)

C. E. COOLEY & E. G. NASON.

MOTOR.

No. 379,004. Patented Mar. 6, 1888.

Witnesses,
Geo. H. Strong.
J. H. Rouse.

Inventors,
C. E. Cooley,
E. G. Nason,
By Dewey & Co.
attys

UNITED STATES PATENT OFFICE.

CHANCEY E. COOLEY AND EDWARD G. NASON, OF FORT JONES, CALIFORNIA.

MOTOR.

SPECIFICATION forming part of Letters Patent No. 379,004, dated March 6, 1888.

Application filed August 31, 1887. Serial No. 248,419. (No model.)

*To all whom it may concern:*

Be it known that we, CHANCEY E. COOLEY and EDWARD G. NASON, of Fort Jones, Siskiyou county, State of California, have invented an Improvement in Motors; and we hereby declare the following to be a full, clear, and exact description of the same.

Our invention relates to the class of motors in which the power is derived from a suspended weight, transmitted through a train of gearing to the machine to be driven, such, for example, as a pump; and our invention consists in the novel arrangement of parts, and the mechanism for controlling the speed, all of which we will hereinafter fully describe.

The object of our invention is to provide a simple, effective, and economical motor for driving light machinery, and especially pumps.

Figure 1:
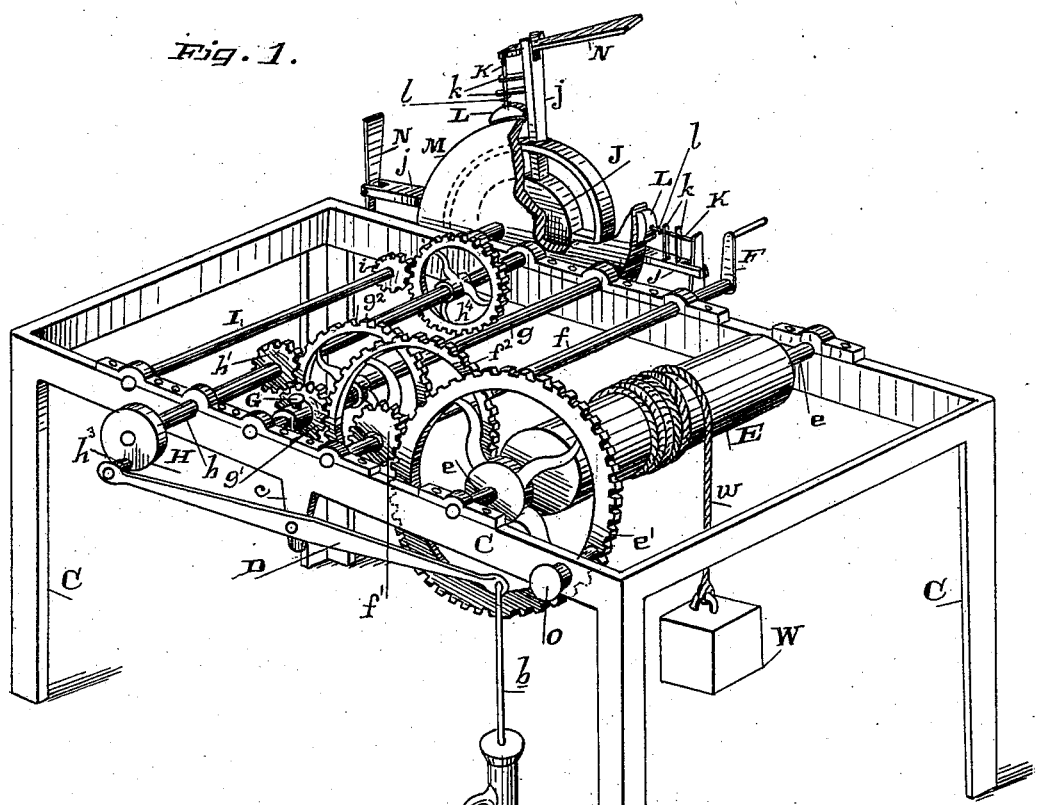
Figure 2:
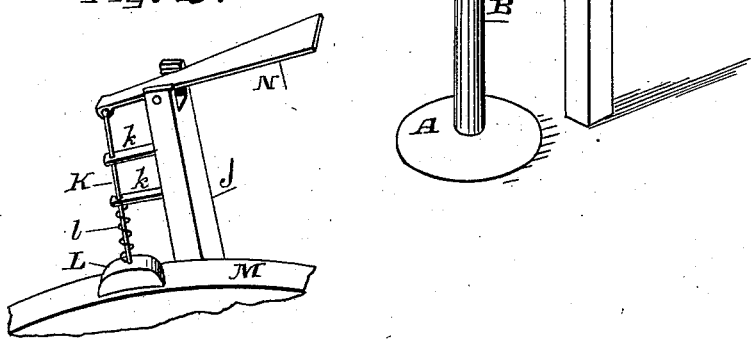

Referring to the accompanying drawings for a more complete explanation of our invention, Figure 1 is a perspective view of our motor. Fig. 2 is a detail of the governor.

A is a well, from the mouth of which we have shown projecting the pump-pipe B, in which operates the pump-rod $b$.

C is a frame located over or beside the mouth of the well, and having pivoted to a bracket, $c$, on one side of its top, a walking-beam lever, D, one end of which is connected with the pump-rod. Across the top of the frame and in suitable bearings is journaled a shaft, $e$, carrying a drum, E, and a gear-wheel, $e'$. Attached to the drum and adapted to be wound thereon and unwound therefrom is a cord or cable, $w$, to the lower end of which is secured a weight, W. Across the top of the frame is also mounted a shaft, $f$, one end of which is provided with a crank, F, and the other end carries a pinion, $f'$, which meshes with the gear $e'$, and said shaft also carries a large gear, $f^2$. Across the frame is mounted a third shaft, $g$, which carries a pinion, $g'$, which meshes with the gear $f^2$ of the preceding shaft, and said shaft $g$ also carries a large gear, $g^2$. The pinion $g'$ is mounted on the shaft $g$ in such a way that it can be moved thereon, so as to throw it into or out of engagement with the gear $f^2$, said pinion being held to position by a set-screw, G. When the pinion $g'$ is moved out of engagement, it is obvious that by operating the crank F the power is transmitted through the gears of the shaft $f$ and the gears of the shaft $e$ to said latter shaft, whereby the drum E is rotated, and the weight W may be wound up for the beginning of the operation. Across the frame is mounted a fourth shaft, $h$, which carries a pinion, $h'$, which meshes with the gear $g^2$ of the preceding shaft. The end of the shaft $h$ is provided with a crank-disk, H, which is connected by a crank-pin, $h^3$, with the other end of the pump-operating walking-beam D.

It will now be seen that when all the gears are in proper engagement and the weight wound up the drum will be rotated and the power transmitted through the gears to the crank-disk H, which will oscillate the lever D, thereby operating the pump; but in order to control and govern the application of this power we have the following mechanism:

Across the frame is mounted a fifth shaft, I, upon which is secured a pinion, $i$, which meshes with a gear, $h^4$, on the shaft $h$. The end of the shaft I is projected beyond the frame and carries a disk, J, in the periphery of which are secured four radial arms, $j$. To the ends of vanes N are secured rods K, which are guided by suitable staples or guide-sockets, $k$, so that they may have a movement in the direction of the length of the arms. The lower ends of these rods carry small brake-shoes L, which are adapted to bear upon the rim or periphery of the fixed disk M, which is bolted to the side of the main frame C. The brake-shoes are held normally out of contact with the disk M by means of springs $l$, which encircle the rods between them and the lower guides, $k$, being secured to both. In the outer end of each arm $j$ is pivoted a vane or wing, N, one end of which is just above and is secured to the upper end of the sliding rod K, as before stated.

The operation of this governing mechanism is as follows: As the speed of the shaft I becomes greater and the rotation of the disk J, which it carries, and the arms $j$, carried by the disk, increases, the vanes or wings N are forced by the centrifugal motion toward a perpendicular, so that their short ends bear down the rods K, thereby forcing said rods down and throwing their brake-shoes L into contact with the rim of the fixed disk M, thereby braking the disk J and controlling the motive power.

It is obvious that instead of cog-gearing we may use friction-gearing.

Having thus described our invention, what we claim as new, and desire to secure by Letters Patent, is—

1. In a motor, a pivoted lever, D, connected with the machine to be driven, and a shaft, h, carrying a crank-disk, H, connected with one end of the pivoted lever, in combination with a shaft, e, a drum on said shaft, a weight, W, a cord suspending said weight from the drum, a train of gearing between the drum-shaft and the crank-shaft, whereby the latter is operated, and a brake mechanism comprising a fixed and a rotating disk and sliding rods carrying brake-shoes, substantially as herein described.

2. In a motor, a drum, a weight suspended therefrom, whereby it is rotated, and a train of gearing between said drum and the mechanism to be driven, in combination with the means for controlling the speed, comprising a rotating disk operated by the train of gearing, arms on said disk carrying pivoted blades or wings, sliding rods carried by the arms and having brake-shoes, and a fixed disk against which the shoes are forced by the movement of the vanes or wings of the arms, substantially as herein described.

3. In a motor, the pivoted lever or walking-beam connected with the machine to be driven, the crank connected with said lever, the winding-drum and the weight suspended therefrom, and a train of gearing between said drum and the crank-shaft, in combination with the shaft I, gears by which said shaft is rotated from the crank-shaft, the disk on the end of said shaft I, the arms with pivoted vanes carried thereby, the spring-actuated sliding rods operated upon by said vanes and having brake-shoes, and the fixed disk M, against which the brake-shoes operate, whereby the power is controlled, all arranged and adapted to operate substantially as herein described.

In witness whereof we have hereunto set our hands.

CHANCEY E. COOLEY.
EDWARD G. NASON.

Witnesses:
J. NEWTON,
JOHN KRAMER.